(12) United States Patent
Selvig et al.

(10) Patent No.: US 11,582,963 B2
(45) Date of Patent: Feb. 21, 2023

(54) FLYING INSECT LIGHT TRAP MONITORING SYSTEM

(71) Applicant: Terrier Technologies, LLC, Minneapolis, MN (US)

(72) Inventors: Andrew John Selvig, Eagan, MN (US); Dylan O'Donnell, Minneapolis, MN (US)

(73) Assignee: Terrier Technologies, LLC, Minneapolis, MN (US)

( * ) Notice: Subject to any disclaimer, the term of this patent is extended or adjusted under 35 U.S.C. 154(b) by 646 days.

(21) Appl. No.: 16/392,877

(22) Filed: Apr. 24, 2019

(65) Prior Publication Data
US 2019/0327951 A1 Oct. 31, 2019

Related U.S. Application Data

(60) Provisional application No. 62/662,293, filed on Apr. 25, 2018.

(51) Int. Cl.
*A01M 1/02* (2006.01)
*A01M 1/10* (2006.01)
(Continued)

(52) U.S. Cl.
CPC ............ *A01M 1/026* (2013.01); *A01M 1/106* (2013.01); *A01M 1/145* (2013.01); *G05B 15/02* (2013.01); *G06K 9/6267* (2013.01); *G06V 10/30* (2022.01)

(58) Field of Classification Search
CPC ...... A01M 1/026; A01M 1/106; A01M 1/145; A01M 1/04; G05B 15/02; G06K 9/40; G06K 9/6267
See application file for complete search history.

(56) References Cited

U.S. PATENT DOCUMENTS 7,401,436 B2 * 7/2008 Chyun .................. A01M 1/145
43/113
10,694,733 B2 * 6/2020 Willcox .................. F21V 23/06
(Continued)

FOREIGN PATENT DOCUMENTS

CN          1252686 A  *  5/2000  .......... A01M 1/2011
CN       108770799 A  *  11/2018  .............. A01M 1/02
(Continued)

*Primary Examiner* — Peter M Poon
*Assistant Examiner* — Carly W. Lynch
(74) *Attorney, Agent, or Firm* — DeWitt LLP

(57) ABSTRACT

A flying insect light trap monitoring device and related methods and systems. The flying insect light trap monitoring device includes a housing, camera, controller, and communications module. The housing includes a mounting structure configured to couple with a flying insect light trap. The camera generally includes a wide angle lens. The camera and wide angle lens are secured to the housing and take a digital photograph image of a glue board in the flying insect light trap. The controller, including a processor and a memory, is secured within the housing and is communicatively coupled to the camera. The controller receives the digital photograph image. The communications module is operatively coupled with the controller and sends data packets, including the digital photograph image, to a remote server. Further, an image processing engine that processes the image and generates an insect count can be included.

8 Claims, 5 Drawing Sheets

(51) Int. Cl.
*G05B 15/02* (2006.01)
*G06K 9/62* (2022.01)
*A01M 1/14* (2006.01)
*G06V 10/30* (2022.01)

(56) References Cited

U.S. PATENT DOCUMENTS

2005/0025357 A1* 2/2005 Landwehr ............. A01M 1/026
                                                            382/170
2011/0026848 A1* 2/2011 Ordentlich ........... G06K 9/6277
                                                            382/260
2014/0003736 A1* 1/2014 Medina, III ....... G06K 9/00442
                                                            382/275
2019/0350185 A1* 11/2019 McGowan .............. A01M 1/10

FOREIGN PATENT DOCUMENTS

EP             1679001 A2 *  7/2006  ............. A01M 1/10
JP          2013236586 A  * 11/2013  ............. A01M 1/14

* cited by examiner

FLYING INSECT LIGHT TRAP MONITORING SYSTEM

PRIORITY

This application claims the benefit of and priority to U.S. Provisional Application No. 62/662,293 filed Apr. 25, 2018, the entirety of which is incorporated herein by reference.

TECHNICAL FIELD

The present invention relates to flying insect light traps, and more particularly, to glue board-type flying insect light traps, and related camera-based monitoring devices, systems, and methods for effectively monitoring and servicing flying insect light traps.

BACKGROUND

Various types of flying insect light traps have been used in the pest control industry to attract and capture flying insects. These devices have generally been used to prevent flying insects from interfering with sensitive operations such as food processes and preparation, and to monitor the level of flying insect activity to determine if additional remediation steps are needed. Some existing flying insect light traps have typically consisted of one or more light bulbs that emit wavelengths of light that attract flying insects, and one or more glue boards that contain an adhesive coating on which flying insects are trapped.

When these types of traps are maintained as part of regular pest control services, a pest control technician removes old glue boards, cleans the trap, and inserts new glue boards. The technician also counts, often by rough estimation, the number of insects on the glue boards and records these readings for the purpose of determining trends and communication with the client.

However, the current method of counting and recording flying insect activity is problematic for various reasons. For example, manually counting is often either time consuming, inaccurate, or both. Further, the activity information is typically very limited as it is only captured as often as the pest control technician can physically inspects the trap. This inspection is often only once per week or less. Also, because of the low frequency of service, high pest activity is often recorded well after it occurs, which limits the effectiveness of the trap and potential remediation efforts.

Accordingly, there is a desire for improved flying insect light traps and monitoring thereof, including monitoring systems which overcome past difficulties and aid in effective and timely servicing and monitoring of these devices.

SUMMARY

Embodiments described or otherwise contemplated herein substantially provide advantageous monitored flying insect light traps and related monitoring devices and systems. Embodiments generally can relate to monitoring devices that releaseably attach or are integrated for permanent or long term use with a flying insect light trap. The monitoring devices generally contain a camera pointed at one or more glue boards located in the trap. The monitoring devices can automatically, periodically, take photographic images of the glue board(s). Additionally, a computer vision algorithm can be used, locally or remotely, as part of an image processing engine to automatically detect the number of flies present on the glue board based on these photographic images. This information can be stored, either on the monitoring devices or on a separate server, for use in reporting and trending the flying insect activity in the trap. By recording the flying insect activity at regular intervals that are much more frequent than practical for humans to service the trap (e.g. once per hour), detailed activity trending can be collected and used by the pest control technicians to respond to high activity events and improve the response time of their service.

One embodiment relates to a flying insect light trap monitoring device that includes a housing, camera, controller, and communications module. The housing includes a mounting structure configured to couple with a flying insect light trap. The camera generally includes a wide angle lens. The camera and wide angle lens are secured to the housing and takes a digital photograph image of a glue board in the flying insect light trap. The controller includes a processor and a memory. The controller is secured within the housing and is communicatively coupled to the camera. The controller receives the digital photograph image. The communications module is operatively coupled with the controller and sends data packets, including the digital photograph image, to a remote server.

In some embodiments the monitoring device includes an image processing engine that processes the digital photograph image and automatically generates a count of flying insects shown on the glue board. In some embodiments, the image processing engine further classifies the flying insects shown on the glue board by size and shape.

In some embodiments, the digital photograph image is sent by the communications module for remote processing to determine a count of flying insects shown on the glue board.

In some embodiments, the communications module sends an alert signal for a technician when the flying insect light trap requires glue board replacement or serving.

One embodiment relates to a flying insect light trap monitoring system. The system includes a plurality of flying insect light traps, a plurality of monitoring devices, and a server. The plurality of flying insect light traps, each includes: at least one light bulb that emits wavelengths of light that attract flying insects; a light housing supporting and partially surrounding the at least one light bulb; and a glue board in the light housing, adjacent the light bulb, that captures flying insects. The plurality of monitoring devices are each associated with a different one of the plurality of flying insect light traps. Each monitoring device includes: a housing including a mounting structure coupled to the light housing of the flying insect light trap it is associated; a camera and a wide angle lens, secured to the housing, that takes a digital photograph image of the glue board in the flying insect light trap; a controller, including a processor and a memory, secured within the housing and communicatively coupled to the camera, the controller receiving the digital photograph image; and a communications module, operatively coupled to the controller, that sends the digital photograph image for processing remotely. The server includes an image processing engine that receives the digital photograph image from the communications module and that processes the digital photograph image to determine an insect count.

In some embodiments, the image processing engine includes instructions that, when executed on the server, cause the server to: dewarp the digital photograph image to account for spacial warping near the edges of the images; normalize the digital photograph image to remove variations in lighting conditions and shadows; apply a Gaussian Blur to reduce noise present in the digital photograph image; use a threshold filter to distinguish between background objects and foreground objects in the digital photograph image; apply an erosion filter to shrink the area of the digital photograph image covered by each flying insect to separate closely located flying insects; and determine the insect count by automatically estimating the number foreground spots on the image.

In some embodiments, the image processing engine further includes instructions that, when executed on the server, cause the server: to classify the flying insects shown by size and shape.

Another embodiment relates to a method of monitoring flying insect light traps. The method includes capturing a digital photograph image of a glue board located in a flying insect light trap. The method further includes using an image processing engine that processes the digital photograph image and automatically provides an insect count. Use of the image processing engine includes: dewarping the digital photograph image to account for spacial warping near the edges of the image; normalizing the digital photograph image to remove variations in lighting conditions and shadows; applying a Gaussian Blur to reduce noise present in the digital photograph image; using a threshold filter to distinguish between background and foreground objects in the digital photograph image; applying an erosion filter to shrink the area of the digital photograph image covered by each flying insect to separate closely located flying insects; and determining the insect count by estimating the number foreground spots on the digital photograph image. Further, the method includes reporting the insect count.

Another embodiment relates to a flying insect light trap. The flying insect light trap includes at least one light bulb that emits wavelengths of light that attract flying insects, a light housing supporting and partially surrounding the at least one light bulb, a glue board in the light housing that is adjacent the light bulb and that captures flying insects, and a monitoring device. The monitoring device is coupled with the light housing and includes a camera, a controller, and a communications module. The camera has a wide angle lens and takes a digital photograph image of the glue board. The controller includes a processor and a memory that is communicatively coupled to the camera. The controller receives the digital photograph image. The communications module is operatively coupled to the controller and sends data packets, including the digital photograph image, to a remote server.

In some embodiments, the monitoring device includes an image processing engine that processes the digital photograph image and automatically generates a count of flying insects shown on the glue board.

In some embodiments, the image processing engine classifies the flying insects shown on the glue board by size and shape.

The above summary is not intended to describe each illustrated embodiment or every implementation of the subject matter hereof. The figures and the detailed description that follow more particularly exemplify various embodiments.

BRIEF DESCRIPTION OF THE FIGURES

Subject matter hereof may be more completely understood in consideration of the following detailed description of various embodiments in connection with the accompanying figures, in which.

Figure 1:
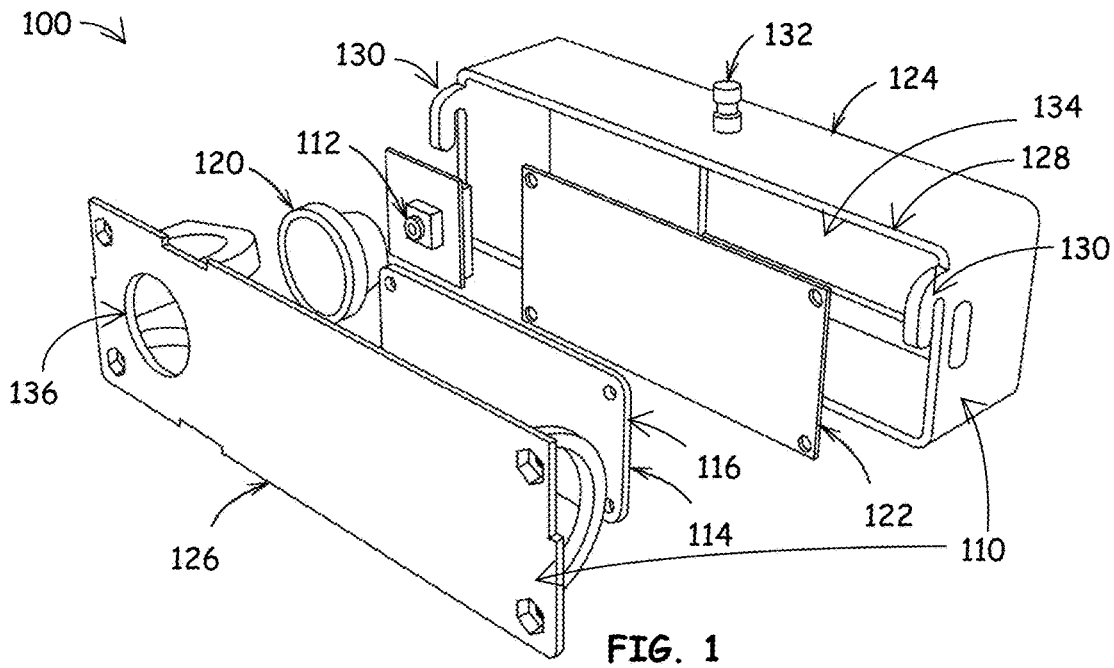
FIG. 1 is an exploded perspective view of a flying insect light trap monitoring device, according to an embodiment.

While various embodiments are amenable to various modifications and alternative forms, specifics thereof have been shown by way of example in the drawings and will be described in detail. It should be understood, however, that the intention is not to limit the claimed subject matter to particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 generally shows an embodiment of a flying insect light trap monitoring device 100. Such monitoring devices 100 are generally for use on, or as an integral part of, flying insect light traps 200 (see FIGS. 2 and 3). In general, monitoring device 100 includes a housing 110, camera 112, controller 114, and communications module 116. Other components found in embodiments of the monitoring device 100 include a wide angle lens 120 and a LCD display board 122.

The housing 110 collectively includes a rear housing 124 and a front housing panel 126. Rear housing 124 defines a generally box-shaped structure that with generally flat wall surfaces on five sides that define an interior cavity. The rear housing 124 has one side with a rectangular opening 128 in which front housing panel 126 is retained. The rear housing 124 further includes mounting structures in the form of one or more hooks 130 that extend outwardly and downwardly from the two side edges surrounding the rectangular opening 128. These hooks 130 are configured to hang on or otherwise releaseably couple with a grill or other pertinent structure of a flying insect light trap 102. Various other mounting structures can be used to couple the housing 110 to a flying insect light trap 102. Some examples may include clips, magnets, fasteners, brackets, adhesives, interference fits or other means of connection. Mounting structures can be integrally formed with the housing or may be otherwise secured to the rear housing 124 or front housing 126 for long term use.

Rear housing 124 can further include a button 132 mounted on its upper surface which can be pressed or otherwise manipulated for manual control of image capture and control of the device. Other types of buttons 132 and locations for placement of this button 132 are contemplated by this disclosure and FIG. 1 should not be considered to be limiting. Rear housing may further include a window 134 for the LCD display 122 on the side of rear housing 124 opposite the rectangular opening 128. Accordingly when a monitoring device 100 is mounted with the rectangular opening 128 adjacent a flying insect light trap 200, the LCD display 122 can be readily viewed.

Front housing panel 126 is generally a flat panel of material with a notched perimeter sized to couple with the rear housing 124. An aperture 136 is located at one side to prevent obstruction and accommodate the camera 112 and wide angle lens 120. The interior surface of the front housing panel 126 further can include various mounting structures and components for supporting, securing, or coupling with the camera 112, lens 120, controller 114, LCD display board 122 and other interior components and structures.

Rear housing 124 and front housing 126 can be made of plastic, metal, or other suitable material. Further, in some embodiments, the housing 110 may be waterproof or have components sealed in a watertight manner to prevent intrusion by moisture, insects or other unwanted material. The overall size of the housing 110 can vary, but can be very small dimensionally in some embodiments to avoid significant obstruction of light from the flying insect light trap 200 on which it is used. Some housings 110 can have dimensions of only an inch or two in length and height, for example. Other housings of various shapes and sizes can be used as well, such as cylindrical. The rectangular box-shaped configuration shown in FIG. 1 should not be deemed to be limiting.

FIG. 1 also depicts camera 112 and an associated wide angle lens 120. Camera 112 can be any type of digital camera of sufficient resolution and which is useful for taking pictures from short distances. Lens 120 is used with camera 112 and typically is a wide angle lens. For purposes of this disclosure, a "wide angle lens" includes the type of lenses referred to as "fisheye" and similar types of lenses. Use of a fisheye lens, or other wide angle lens, provides an expanded field of view to the camera 112. This is such that the field of view for the camera can encompass an entire glue board 210 located in a flying insect light trap 200, even when the camera 112 and lens 120 are in close proximity to the glue board 210. Accordingly, the camera 112 and wide angle lens 120 are secured to the housing 110 and adapted to take a digital photograph image of a glue board 210 in the flying insect light trap 200.

Controller 114 is generally depicted by a generic card structure in FIG. 1 as well. The controller 114 can be a computer or computing device in various embodiments. In some embodiments, the controller 144 should be understood to include some or all of one or more processor(s) 140, a memory 142, related circuitry 144, and/or various modules or engines (see FIG. 4), among other components. In some embodiments, various modules or engines will share portions of the controller or only be partially embodied by the controller 114. Controller 114 can be secured within the housing 110 and communicatively coupled to the camera 112. In various embodiments, when operated, controller 114 can receive and/or control digital photographic images taken by the camera 112.

Although not specifically depicted or called out in FIG. 1, a communications module 116 is part of the monitoring device 100 as well. Components of communications module 116 can be directly or indirectly secured to the housing 110 and operatively coupled with, partially embodied by, or integrated with the controller 114. Communications module 116 is able to provide digital photograph images to a remote device 190 (see FIGS. 5 and 6).

Communications module 116 can be configured to transmit and receive information related to the monitoring devices 100. In particular, communications module 116 can transmit and receive data which a server 302 is configured to receive with a corresponding communications module 314. In embodiments, communications module 116 can comprise communications software and transceiver circuitry. Transmitter circuitry can comprise one or more electronic elements configured to transmit and receive data related to monitoring devices 100 or its related system. For example, wireless transceiver circuitry can be configured for radio frequency (RF) communications, Wi-Fi communications, BLUETOOTH communications, or near-field communications (NFC). Wired transceiver circuitries can likewise be utilized, such as CAT-5 and CAT-6. In some embodiments, the communications module 116 may be provisioned to wirelessly connect to a network using Bluetooth and/or Wi-Fi to a mobile device that can in turn be connected to the Internet or using Wi-Fi or long range radio to an intranet at a facility that is in turn connected to the Internet.

FIG. 1 also depicts an LCD display board 122 that can provide a small display screen that is operatively coupled to the controller 114 and can display output in response to manual presses of button 132, for example. LCD display board 122 can be included on an outer surface of the housing via window, clear panel, or external mounting and can be used in a variety of ways to visually communicate any type of information desired to the operator, and should not be viewed as having limited capabilities. In some embodiments, the LCD board may serve as a user interface.

Figure 2:
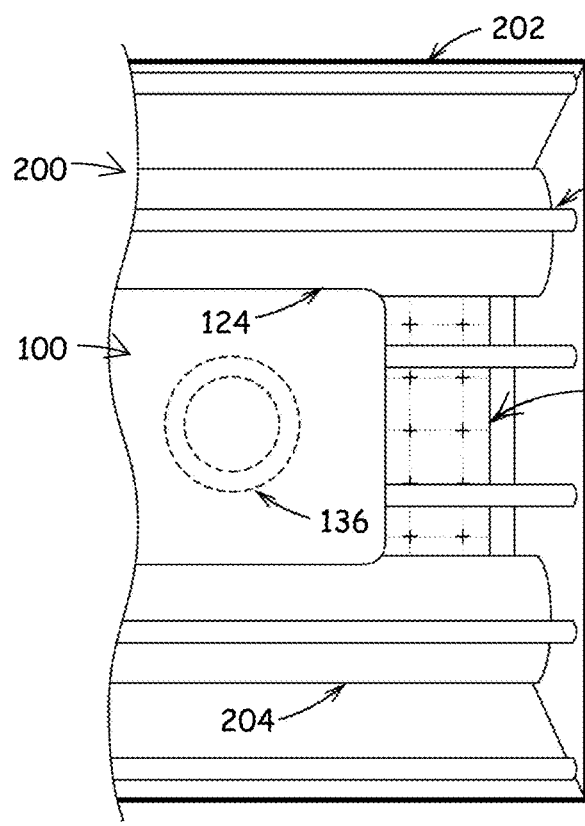
FIG. 2 is a front view of a flying insect light trap monitoring device attached to the front grill of a flying insect light trap, according to an embodiment.
Figure 3:
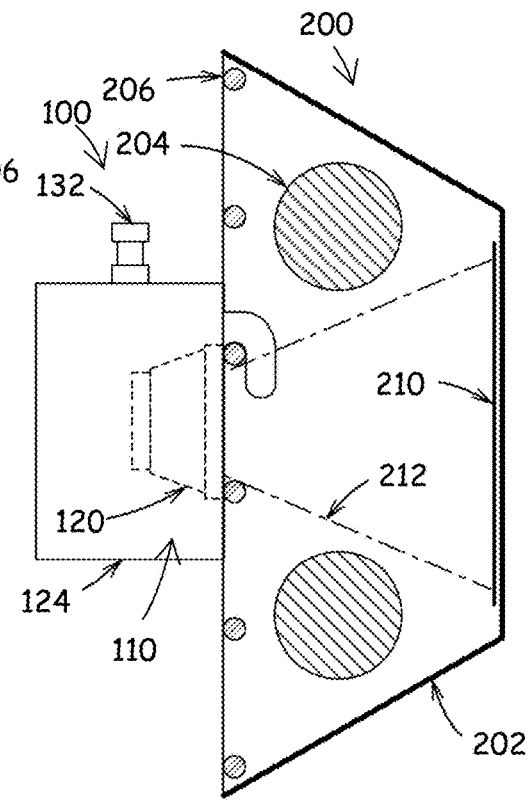
FIG. 3 is a side cutaway view of a flying insect light trap monitoring device attached to the front grill of a flying insect light trap, according to an embodiment.

FIGS. 2 and 3 show a flying insect light trap monitoring device 100 attached to the flying insect light trap 200. FIG. 2 is shown from a partial front view and FIG. 3 is shown from a side cutaway view. The flying insect light trap 200 is depicted having a light housing 202 partially surrounding a pair of light bulbs 204. A horizontally-disposed grill 206 extends across the open side of the light housing 150. Note that the grill 206 is considered part of the flying insect light trap light housing 202 for purposes of this disclosure. Accordingly, coupling to the grill 206 should be considered to be coupling with the light housing 202. In the interior of the light housing 202, opposite the side opening and grill 206, is an adhesive glue board 210. Adhesive glue board 210 is used to capture insects and is located adjacent the light bulbs 204. The glue board 210 is generally mounted such that it can be readily removed and disposed of when the trap is being serviced.

In FIGS. 2 and 3 the monitoring device 100 is hung on the grill 206 such that the outside face of the front housing panel 126 faces the glue board 210 located on the opposite interior side of the light housing 202. Accordingly, the associated camera 112 and lens 120 directly faces the glue board 210 and is provided a generally unobstructed field of view 212.

It should be understood that flying insect light traps 200 vary in sizes and shapes. The number and location of lights 204 and openings present may vary. This disclosure contemplates various sizes, types, housing layouts, and mounting structures for monitoring devices 100, such that they are well-suited and sized for the particular flying insect light trap 200 being used.

Figure 4:
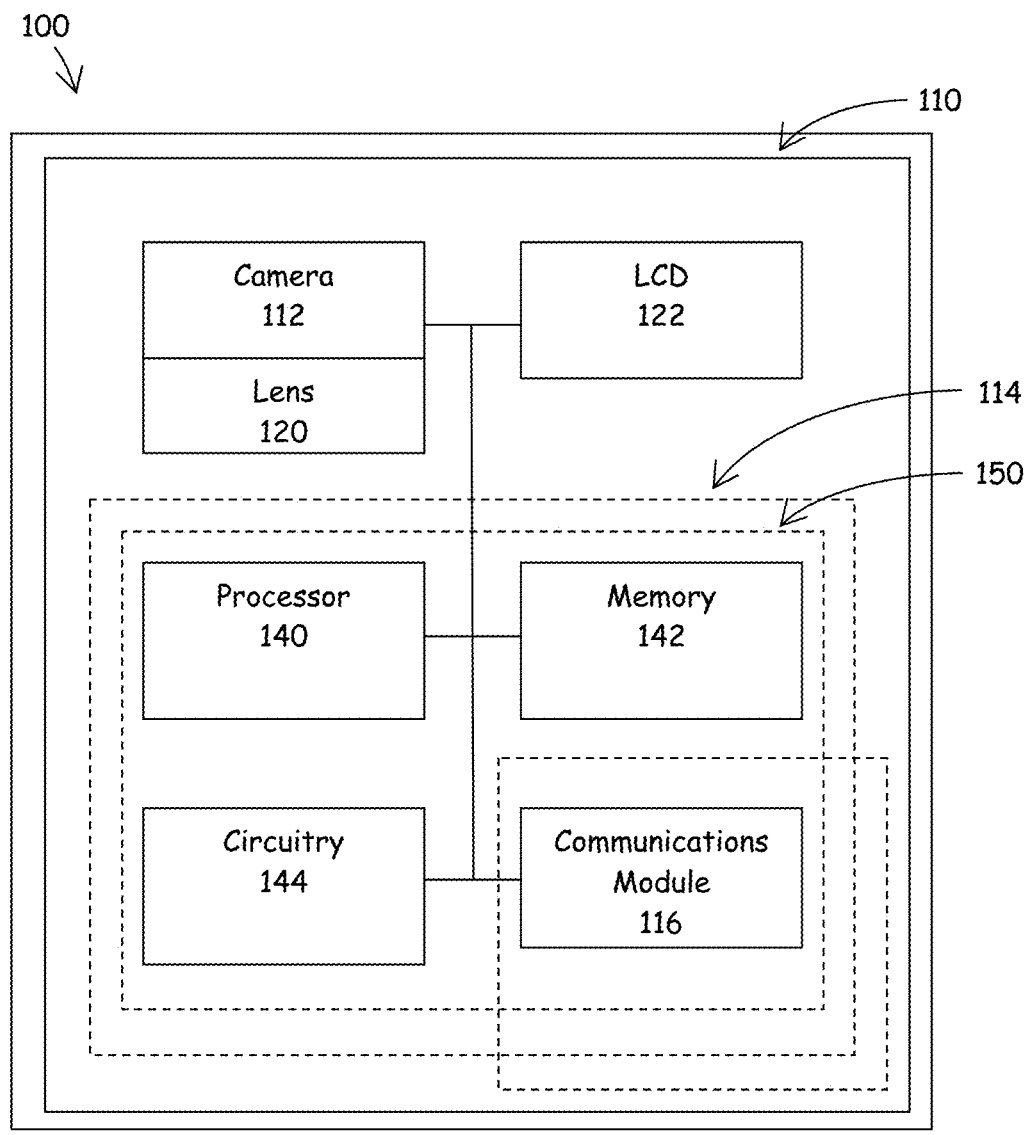
FIG. 4 is a diagram of a flying insect light trap monitoring device, according to an embodiment.

FIG. 4 shows a general diagram of a flying insect light trap monitoring device 100. Specifically, the diagram shows a variety of features and components that can be directly or indirectly coupled to or secured within the housing 110 of the monitoring device 100. These components include: camera 112, lens 120, LCD display panel 122, communications module 116, processor 140, memory 142, circuitry 144, controller 114, and image processing module 150. References to coupling of these components with or to the housing 110 is not restricted to direct contact with the housing 110 but is intended to include indirect attachment or securing, such as by securing multiple of these components together where only one component directly contacts the housing 110. Controller 114 is shown in reference to and including processor 140, memory 142 and circuitry 144, although other components, such as communications module 116 can be considered to be part of or make use of components of the controller 114 in some embodiments. Likewise, image processing module 150 may include or partially make use of components such as processor 140, memory 142, or circuitry 144, for example. Image processing engine 150 is further referenced in FIG. 4. Image processing engine 150 can make use of various components of the controller 114. In some embodiments, no LCD display 122 will be included. Likewise, the components of the monitoring device 100 that are disclosed in FIG. 4 should be understood to be operatively coupled to each other. Such coupling can be arranged in various non-limiting configurations. Communications module 116 can be configured and embodied in various ways as discussed throughout this application.

Figure 5A:
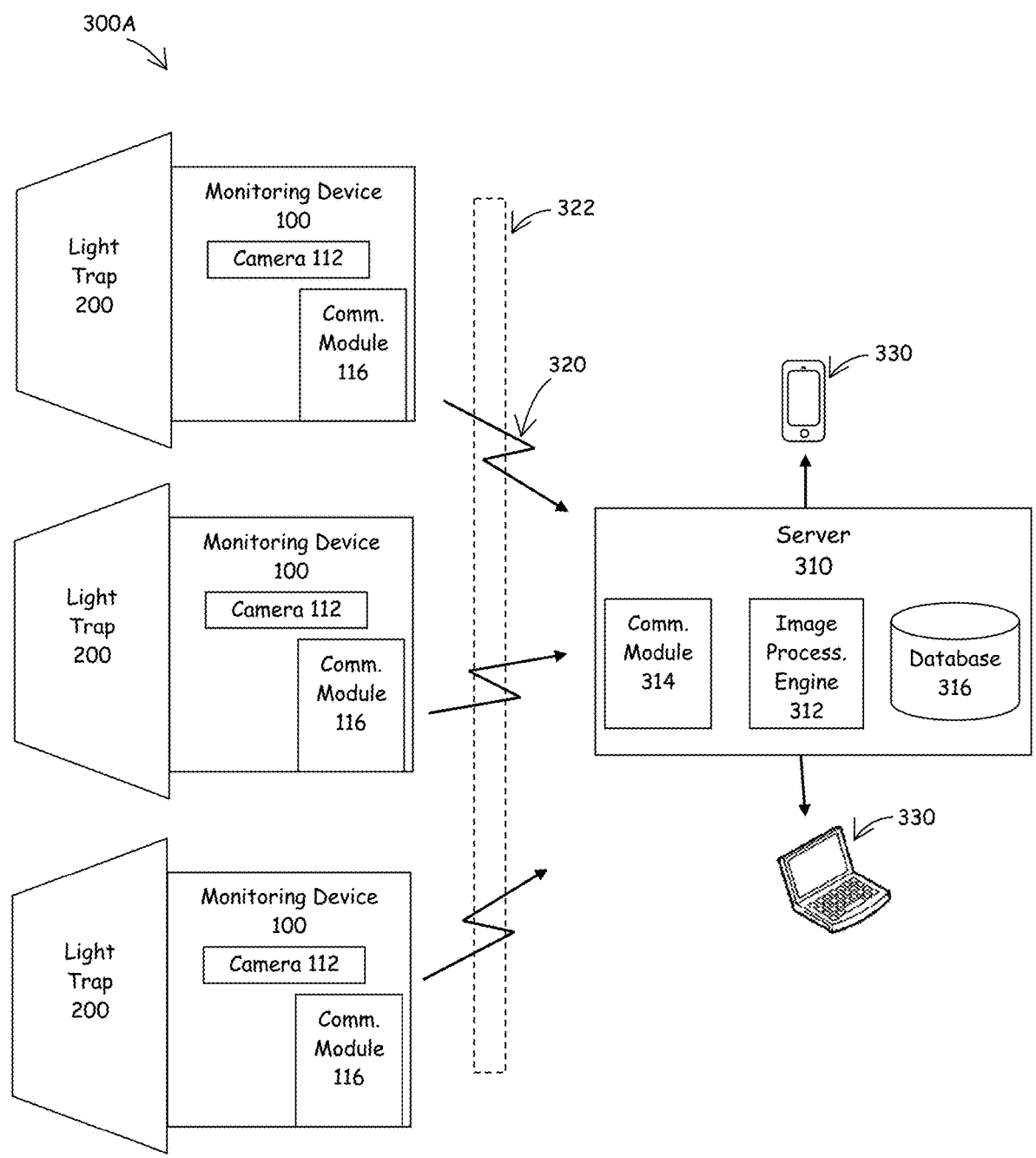
FIG. 5A is a diagram of a flying insect light trap monitoring system, according to an embodiment.

FIG. 5A shows a diagram of a flying insect light trap monitoring system 300A. The system 300A includes a plurality of flying insect light traps 200, a plurality of monitoring devices 100 where each one is associated with one of the plurality of flying insect light traps 200, and a remote server 310. The insect light traps 200 refer to any suitable insect light trap as previously discussed. For example, the insect light traps 200 might each include, at least one light bulb 204 that emits wavelengths of light that attract flying insects, a light housing 202 supporting the light bulb(s), and a glue board 210 in the light housing 202 for capturing flying insects. In some embodiments, the monitoring devices 100 can each include a housing 110, a camera 112 and a wide angle lens 120 that takes digital photograph images of the glue board 210 in the respective flying insect light trap 200, and a communications module 116 that sends the digital photograph images to be processed at a separate processing location.

Specifically, the system 300A of FIG. 5A also includes a remote server 310 that can receive digital photograph images from the monitoring devices 100 and processes each of the images with a image processing engine 312 to determine information such as insect counts. A remote server 310 can include a computing platform or other device with software having capabilities of image processing. Accordingly, a remote server 310 can include one or more processors and databases 316, for example. More specific details related to processing of images received with an image processing engine 312 will be discussed later related to FIGS. 6 and 7.

Many communication options 320 and configurations 322 are possible for sending metadata and images from the respective monitoring devices 100 to a remote server 310. Communication options 320 and configurations 322 represented generically in FIG. 5A to generally reflect any of a variety of well-known communication options and configurations between monitoring devices 100 and a remote server 310. In some embodiments, data packets including the digital photograph image data are sent from each monitoring device 100 to a wireless router, which in turn, provides the data to the remote device 310. In some embodiments the data packets including the digital photograph image data are transmitted to a local device which sends the data packets including the digital photograph image data to the remote device 310. In other embodiments, the data packets including the digital photograph image data are directly sent to the remote device 310. In some embodiments, all transmissions are wireless. In some embodiments, all transmissions are hardwired communications. Once remote server 310 receives the data, data including image data can be processed, tracked and reviewed. Insect counts can be determined and further transmitted to other computers, personal computing devices, or other end user devices 330 for review and manipulation. In some embodiments, the data can be reviewed and manipulated by an end user at the server 310.

Figure 5B:
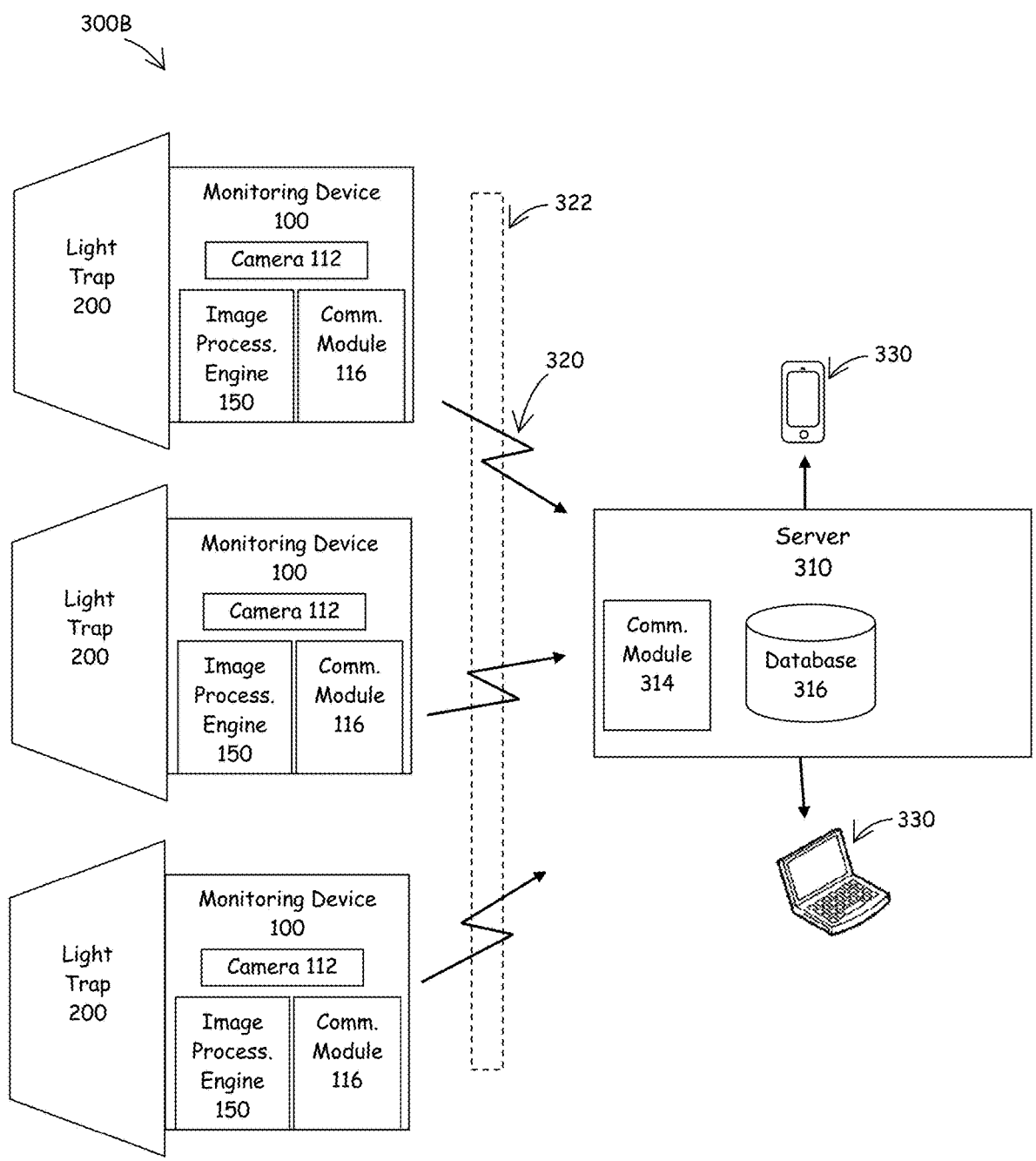
FIG. 5B is a diagram of a flying insect light trap monitoring system, according to an embodiment.

FIG. 5B shows a diagram of a flying insect light trap monitoring system 300B. Similar to FIG. 5B, system 300B includes a plurality of flying insect light traps 200, a plurality of monitoring devices 100 where each one is associated with one of the plurality of flying insect light traps 200, and a remote server 310. However, in FIG. 5B, an image processing engine 150 is present at each individual monitoring device 100, rather than at the server 310. Accordingly, image data is processed at the monitoring devices 100. Although image data is processed at the monitoring devices 100, data packets of relevant data and photographic image data will generally be sent to the server 310 and distributed to end user devices 330.

Figure 6:
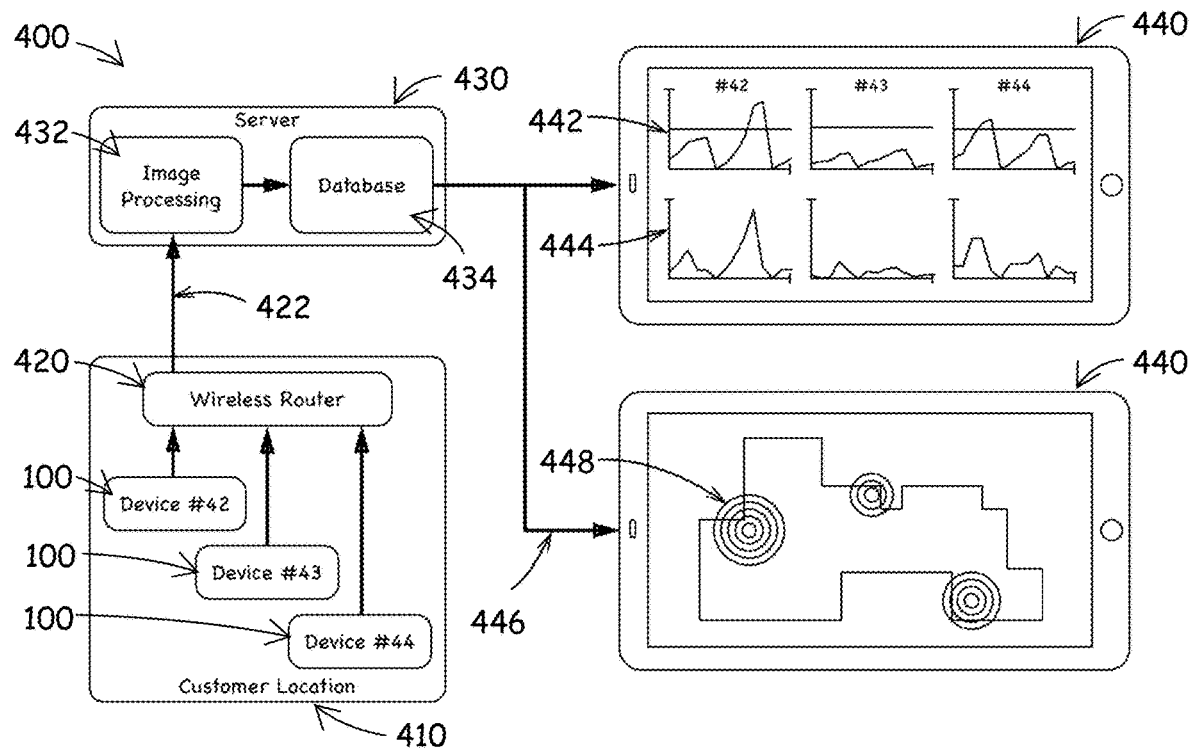
FIG. 6 is a diagram of a flying insect light trap monitoring system, and specifically, the flow of data packets including flying insect images and/or data from a flying insect light trap monitoring device, according to an embodiment.

In FIG. 6, a schematic flow diagram is shown of a flying insect light trap monitoring system 400, with similarities to FIG. 5A. In this system 400, a customer location 410 is depicted, including a plurality of installed monitoring devices 100. Each monitoring device 100 connects to a wireless router 420 which transmits data packets 422 (including digital photographic image data) to a central server 430 at a regular interval. In some embodiments, this interval will be once per hour, once every three hours, once per day, or other length of interval, for example.

As in the other systems described throughout this disclosure, the data packets 422 sent from the monitoring devices 100 can consist of various types of information in the form of raw captured image data and metadata. For example data packets 422 can include: the image captured by the camera; the time of the capture; identifiers for the device itself (such as the light trap to which it is attached, customer location, etc.); and/or the type of capture (i.e. if it was automatic/recurring or due to a manual button press).

The data packets are sent to a remote device, namely a server 430, for processing. The server 430 includes an image processing engine 432 and a database 434. Image processing engine 432 can include hardware and software for determining useful information from the data packets 422. On the server 430, an image processing algorithm (described in the next section) is used as part of the image processing engine 432 to determine the number of flying insects in the image. Additionally, it is possible to classify the flying insects based on size and/or shape. This information is then stored in a database 434 for later retrieval.

End user computing devices 440 can then make use of the processed images and data. Specifically, the captured images and associated data are consumed by an end-use application running on one or more computing devices 440. These applications can be used by either the pest control technician or the customer, for example.

One example of an end-use application includes time-series trending of the flying insect activity. Specifically, by plotting the activity vs time, trends in activity can be visualized and used to inform corrective actions. This is depicted by trend plots 442 in FIG. 6.

Another example of an end-use application includes time-series plotting of differential flying insect activity. Specifically, by plotting differential activity vs time, the times of day causing the greatest activity change will stand out. This is depicted by differential trend plots 444 in FIG. 6, where change in flying insect activity vs time is shown for each device.

Another example of an end-use application that utilizes data packets 446 of aggregated trend data is shown in FIG. 6 as well. It relates to heat-mapping of insect activity. More specifically, by plotting the activity based on the physical locations of the light traps, a heat map can be overlaid on a map of the customer location. This aids in understanding where—in the location—the activity is occurring. This is depicted by heat maps 448 in FIG. 6.

In various embodiments, including monitoring devices 100 and systems 300A, 300B, and 400, the monitoring device or system may further include alerting and alarming capabilities as well. For example, upon processing of images at the monitoring devices 100 or server 310 (or 430), if a threshold valve for insect count is exceeded, an alarm or alert can be sent to a service technician at the end user devices 330 (or 440). Alerts could likewise be generated for a variety of other monitoring device conditions, malfunctions, errors, as well. For example, monitoring devices 100 may include sensors to sense trap errors and environmental data such as temperature, pressure, light, and sound. These alerts can be signals sent directly or indirectly to the end user devices 330 via the server 310 (or 430) or directly or indirectly from the monitoring devices 100 themselves. Appropriate wired or wireless communication, as previously referenced, can be utilized. Alerts can include push-notifications to user devices, email messages, text messages, vibrations, audible sounds or alarms. Details related to the location and status of the relevant trap can be provided with the alerts as well. In some cases, this may include images of the glue boards 210 in the light trap 200 generating the alert. Alerts enable a technician to promptly address traps that are in need of servicing and to maximize their usefulness by always ensuring an effective glue board is present, for example.

Figure 7:
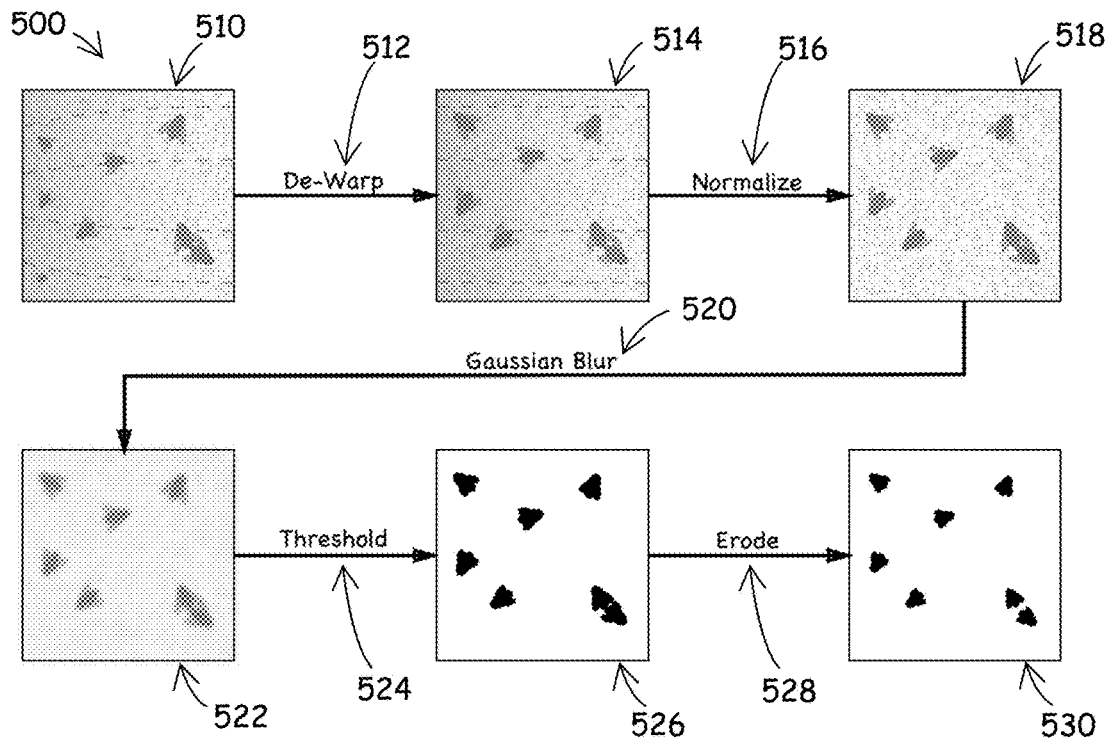
FIG. 7 is a flow diagram of image processing used by the image processing engine to count flying insects using the monitoring device and/or system, according to an embodiment.

Referring to FIG. 7, a flow diagram 500 is provided of image processing, performed by an image processing engine 150 (or 312), that is used to count flying insects using the monitoring device 100 and/or related server 310 or system. As depicted in FIG. 7, in order to process a raw image and determine the number of flying insects on the glue board, a number of steps can be taken.

Once the raw image 510 is received, a dewarping process 512 is performed. Specifically, if a fisheye or similar lens is used, the fisheye lens causes the captured image to be spatially warped (as objects near the edge of the image, they appear smaller). In order to make all objects in the image a consistent size, a de-warping transformation is applied.

Once an updated image 514 is obtained, a normalizing process 516 is performed. Due to variations in lighting conditions and shadows, some portions of the image may be lighter or darker than others. Accordingly, the image is normalized in this step to remove such variation and ensure that the remaining steps are applied equally to all parts of the image.

Accordingly, the resulting new image 518 is then subjected to a Gaussian Blur at 520. A Gaussian blur is applied to reduce the noise present in the image. An updated image 522 is obtained.

Next, a thresholding process 524 is performed on the image 522. Specifically, the image is passed through a threshold filter to distinguish between background and foreground objects. The result is a further updated image 526.

This is followed by an erosion process 528 that is carried out on the image 526. This is necessary, as due to the random arrangement of flying insects on the glue board, some flying insects may overlap with one another in the image. An erosion filter is applied to shrink the area covered by each flying insect, thereby separating some insect that are in close proximity to one another. A final processed image 530 is obtained.

Finally, the flying insect count can be estimated by counting number of foreground spots remaining in the image. This is done automatically with a high degree of accuracy following the processing steps. In some embodiments, the flying insets shown on the glue board will further be classified by size and shape. Various other data sets can be obtained from the processed image to document insect activity and trap usage. In some embodiments, alerts will be sent out to technicians in response to flying insect counts that identify particular traps for servicing.

Accordingly, image processing engine 150 can include instructions that, when executed on a server 310, for example, cause the server 310 to: dewarp the digital photograph image to account for spacial warping near the edges of the images; normalize the digital photograph image to remove variations in lighting conditions and shadows; apply a Gaussian Blur to reduce noise present in the digital photograph image; use a threshold filter to distinguish between background objects and foreground objects in the digital photograph image; apply an erosion filter to shrink the area of the digital photograph image covered by each flying insect to separate closely located flying insects; and determine the insect count by automatically estimating the number foreground spots on the image. Further, the image processing engine can further include instructions that, when executed on the server, cause the server: to classify the flying insects shown by size and shape. Further, determinations related to whether a threshold insect count or percentage of glue board surface has been used can be made. Alert signals to technicians can be sent as necessary based upon such determinations.

Methods of monitoring flying insect light traps may include first capturing a digital photograph image of a glue board located in a flying insect trap followed by using an image processing engine that processes the digital photographic image and automatically provides an insect count as described above. Further, reporting the insect count may be included as well. Some embodiments may include identifying if the processed images or the corresponding insect counts are indicative of traps requiring servicing and sending alerts to technicians indicating traps that require servicing.

Various advantageous features can be realized from the devices, systems, and methods disclosed. For example, the monitoring device and camera configurations disclosed generally provide devices which generally lack moving parts which can come with the benefit of reduced costs and increased reliability. Further, in various embodiments, the ability to automatically classify insects based upon size and shape with the device or system provides potentially useful details beyond even basic insect count details that would not be readily available otherwise. This can be useful as knowing the classification of insects can lead to potentially different remediation actions or efforts. Further, because photographic image data is retained at regular intervals, this can provide important proof of service evidence to show that technicians are timely and effectively servicing traps and doing their jobs well. Having this evidence can help alleviate this issue as a possible point of contention with clients and technicians if the services of a technician are ever called into question.

In embodiments, monitoring device 100, monitoring system 300A, monitoring system 300B, monitoring system 400, and/or their components or systems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application-specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right.

Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed subject matter. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed subject matter.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:
1. A flying insect light trap monitoring system, comprising:
   a plurality of flying insect light traps, each comprising:
      at least one light bulb that emits wavelengths of light that attract flying insects;
      a light housing supporting and partially surrounding the at least one light bulb;

a glue board contained within the light housing, adjacent the at least one light bulb, that captures flying insects; and a grill extending across an open side of the light housing, wherein the glue board is proximately located within the light housing on an opposite interior side than the grill;

a plurality of monitoring devices, each operably coupled with a different one of the plurality of flying insect light traps by being releasably coupled to the grill of each respective flying insect light trap, each monitoring device comprising:

a housing defining an interior cavity, and comprising at least one panel, having a viewing aperture, and at least one mounting structure configured to operably and releasably couple the monitoring device to the grill of the light housing of the flying insect light trap to which it is associated such that the interior cavity of the housing is mounted outside and adjacent the respective flying insect light trap;

a camera and a wide angle lens, secured to the housing, wherein the camera is located within the interior cavity of the housing, the wide angle lens configured to view the glue board within the light housing of the respective flying insect light trap through the viewing aperture of the at least one panel of the housing, such that the configuration of the camera and wide angle lens is capable of taking a digital photograph image of the glue board within the flying insect light trap to which it is associated;

a controller, including a processor and a memory, secured within the housing and communicatively coupled to the camera, wherein the controller is configured to receive the digital photograph image from the camera; and a communications module, operatively coupled to the controller, configured to send the digital photograph image for processing remotely;

a server that includes an image processing engine, configured to receive the digital photograph image from the communications module of any of the monitoring devices, and capable of processing the digital photograph image to determine an insect count on the glue board of each respective flying insect light trap.

2. The flying insect light trap monitoring system of claim 1, wherein the flying insect light trap monitoring system is configured to:

dewarp the digital photograph image to account for spacial warping near the edges of the images;

normalize the digital photograph images to remove variations in lighting conditions and shadows;

apply a Gaussian Blur to reduce noise present in the digital photograph image;

use a threshold filter to distinguish between background objects and foreground objects in the digital photograph image;

apply an erosion filter to shrink the area of the digital photograph image covered by each flying insect to separate closely located flying insects; and determine the insect count by automatically estimating the number foreground spots on the image.

3. The flying insect light trap monitoring system of claim 2, wherein the image processing engine further includes instructions that, when executed on the server, cause the server: to classify the flying insects shown by size and shape.

4. The flying insect light trap monitoring system of claim 1, wherein each of the plurality of monitoring devices includes an LCD display that is included on an outer surface of the housing and is operatively coupled to the controller.

5. The flying insect light trap monitoring system of claim 1, wherein the wide angle lens is a fisheye lens.

6. The flying insect light trap monitoring system of claim 1, wherein the mounting structure includes a pair of hooks.

7. The flying insect light trap monitoring system of claim 1, wherein the communications module provides the digital photograph image via wireless communications.

8. The flying insect light trap monitoring system of claim 1, wherein the communications module provides an alert signal for a technician when one of the plurality of flying insect light traps requires servicing.

* * * * *